April 6, 1937. M. M. BORDEN 2,076,442
MULTIPLE TOTALIZING REGISTER
Filed Jan. 13, 1932 3 Sheets—Sheet 1

Inventor:—
Moro M. Borden
by his Attorneys
Hauson & Hauson

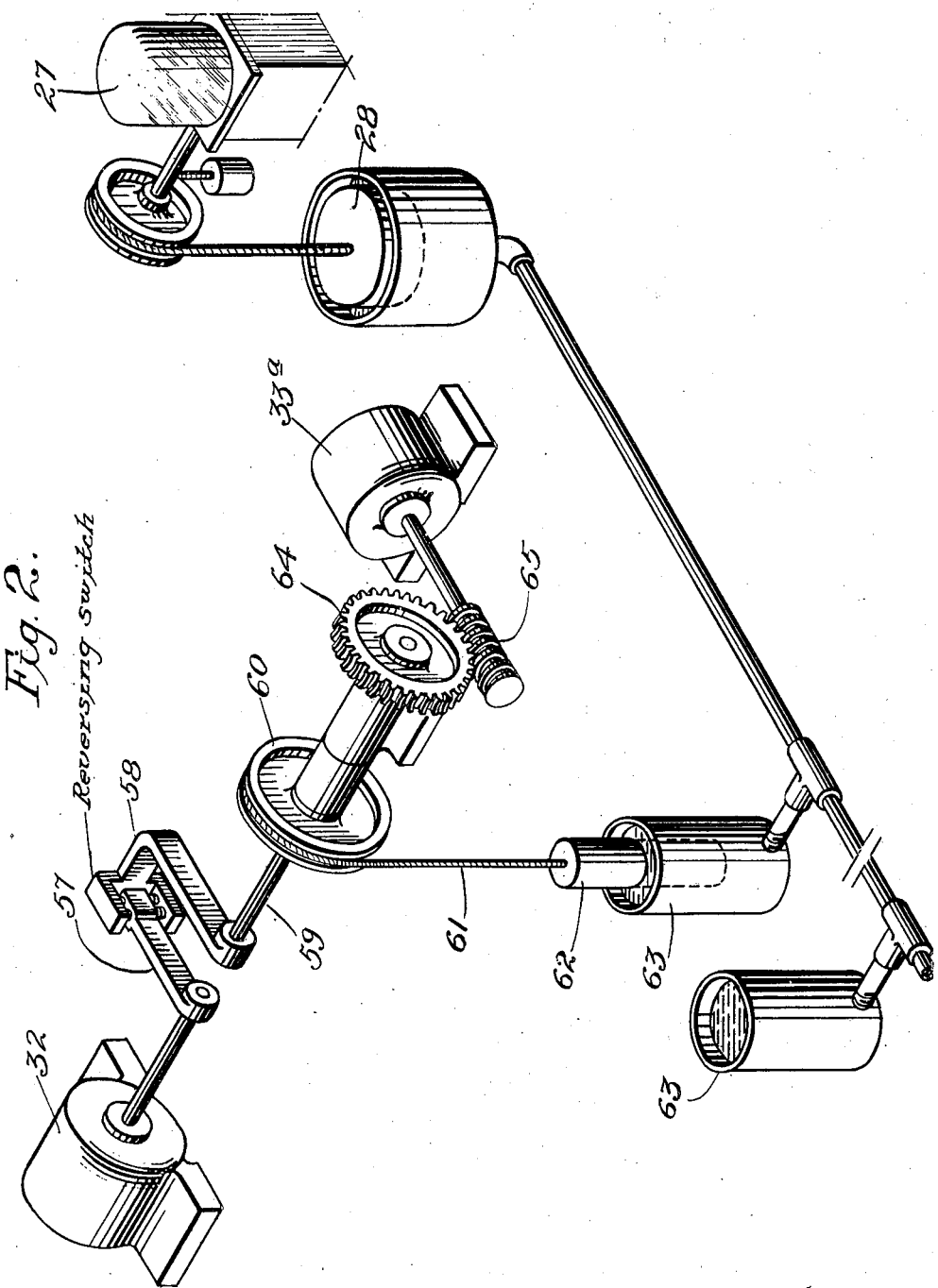

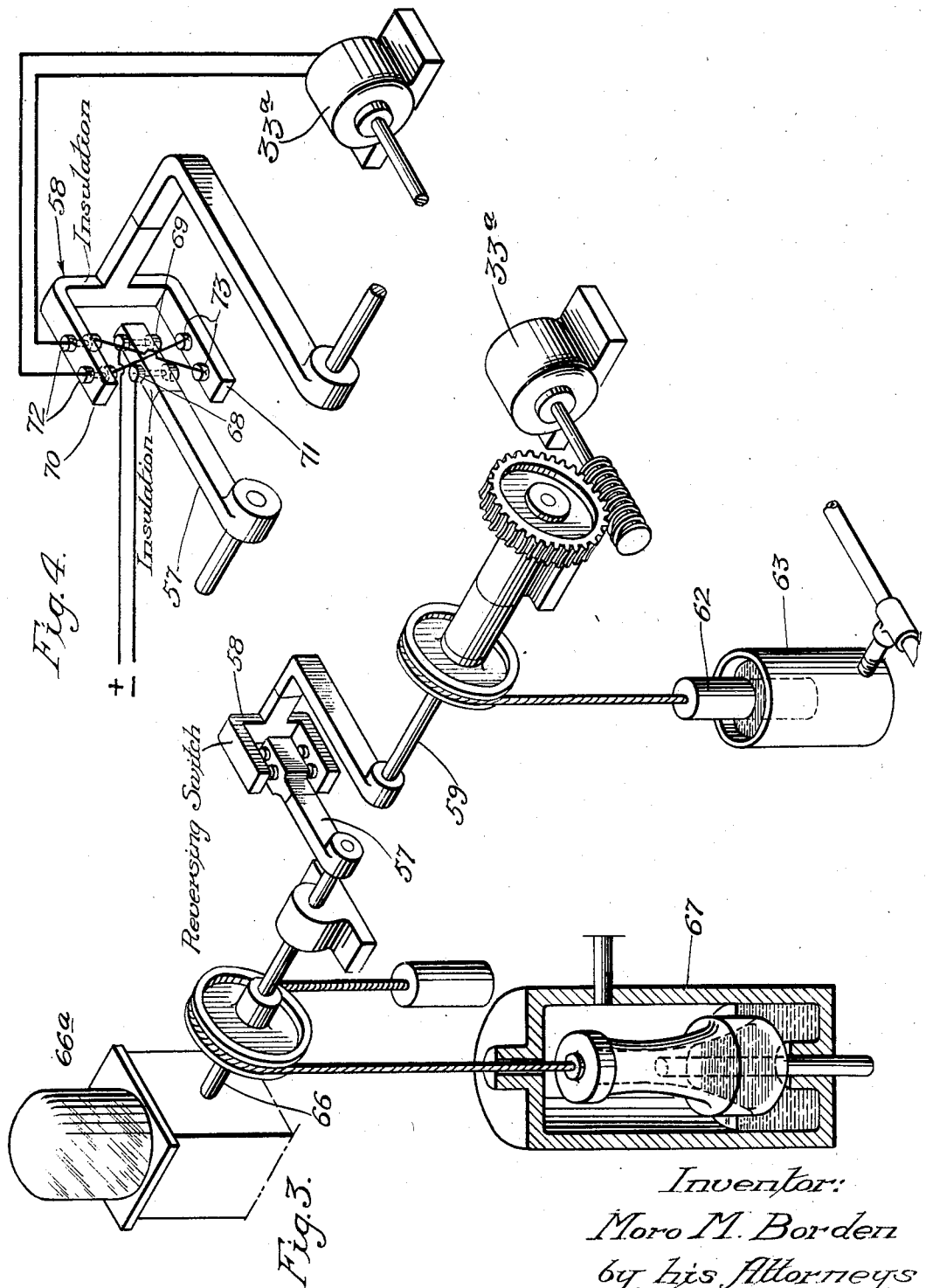

Patented Apr. 6, 1937

2,076,442

UNITED STATES PATENT OFFICE 2,076,442

MULTIPLE TOTALIZING REGISTER

Moro M. Borden, Philadelphia, Pa., assignor to Simplex Valve and Meter Company, Philadelphia, Pa., a corporation of Delaware Application January 13, 1932, Serial No. 586,430

1 Claim. (Cl. 235—92)

This invention relates to totalizing apparatus for meters, and more particularly to a means for indicating at a remote point the total of indications of a plurality of meters.

An important object of the invention is to provide a means associated with each of a plurality of meters for producing at a remote point a proportionate mechanical force based on the meter indications wherein the forces are of such character that they may be additively impressed upon an actuator for a totalizing meter, or a metering device related to the total flow or other force, componently registered by the plurality of meters to perform a function proportionately thereto.

A still further and more specific object of the invention is the provision of means associated with a series of meters, each indicating the volume, flow or some other variable characteristic of fluid medium, and means electrically controlled, and, therefore, operable at a distance for producing a liquid displacement corresponding to the meter reading, these displacements occurring in a single receptacle so that they are additive and may accordingly be expressed on a single register, to thus provide at a distance the total indication of the group of meters.

A still further object of the invention is the provision in an apparatus of this character of an arrangement such that it may be readily applied for direct operation by the meters where this is desired.

These and other objects I attain by the construction shown in the accompanying drawings wherein, for the purpose of illustration, I have shown a preferred embodiment of my invention, and wherein:

Fig. 2 is a partially diagrammatic perspective view showing a slightly modified form of totalizing unit;

Fig. 3 is a semi-diagrammatic view illustrating a construction wherein the dial shaft of the meter is employed for actuation of the reversing switch controlling the displacement element; and Fig. 4 is a diagrammatic view illustrating one type of switch which can be employed for controlling the work motor.

Figure 1:
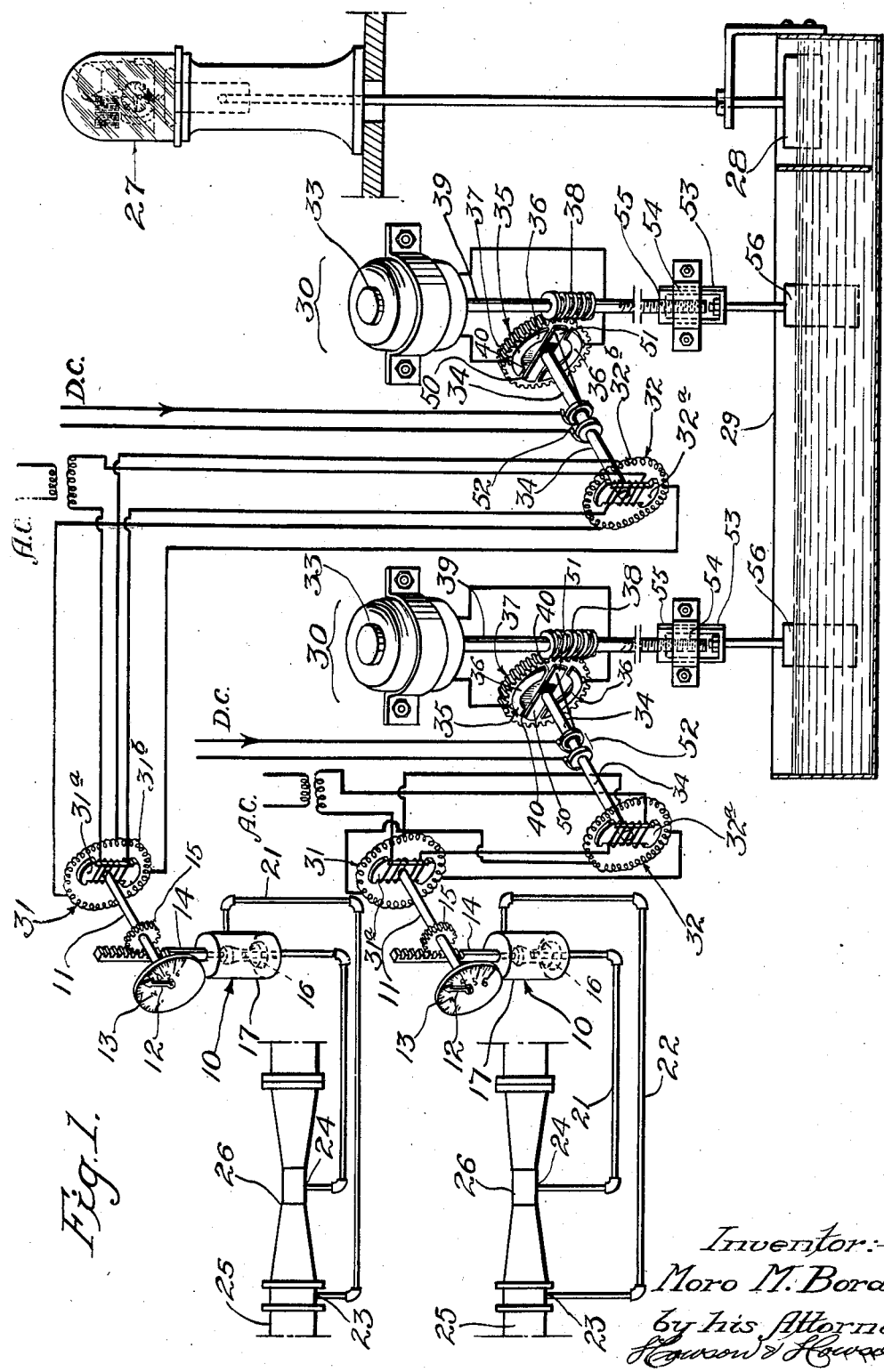
Fig. 1 is a diagrammatic illustration of a totalizing apparatus for meters constructed in accordance with my invention.

For the purpose of illustration, the invention has been shown as adapted to totalize the meter readings of a plurality of meters 10, each of which may be of any suitable construction incorporating a member, as for example, a shaft 11 rotating with the indicator, or having rotation corresponding to the indicating movement of the indicator. In Fig. 1, each meter is illustrated as a flow meter and as comprising the rotating shaft 11 to which is affixed a dial pointer 12 co-acting with a suitable index 13. Rotation of the shaft in response to flow variation is accomplished by a reciprocating rack 14 engaging a pinion 15 carried by the shaft 11, said rack forming a portion of the stem of a piston 16 operating in a cylinder 17. The cylinder through conduits 21—22 is connected with high or low pressure points 23—24 in a flow line 25, these pressure points being at present illustrated as produced by a venturi 26. It will be understood, however, that the elements of the meter proper as indicated with the exception of the rotating shaft 11 coordinated with the indicating element have no bearing whatever on the present invention, and may be of any ordinary or usual construction.

A totalizing register 27 is provided, this totalizing register being of any desired construction, and in the present instance being illustrated as actuated through a float 28 operatively connected thereto in any suitable manner, said float being disposed in a tank 29 containing a liquid maintained at a predetermined volume. The register 27 is of the type commonly employed in conjunction with fluid meters having both indicating and registering mechanism. This indicating and registering mechanism forms no part of my invention, being substantially that illustrated in the patent to Ledoux No. 1,064,748. Associated with this tank are translating elements 30, one for each meter 10, these translating elements being adapted to convert the displacement or movement of the registering element 12 of its associated meter 10 to a corresponding and proportionate mechanical force, namely, displacement of the liquid contained in tank 29.

Connecting each meter 10 and its associated translating element is an electrical control system at present shown as embodying the use of a pair of Selsyn motors 31—32. As is well known to those familiar with motors, a characteristic of the motors, which are usually provided in sets, is that the motors when properly connected will always have the rotors 31a and 32a thereof correspondingly positioned in their respective fields 31b and 32b; that is to say, if the rotor of one of the motors is shifted in its field in a given direction through a given distance, the rotor of the other motor will immediately shift within its field in the same direction and through the same distance.

Such rotors, however, are possessed of but little power and are incapable of generating the necessary mechanical forces for operation of the totalizing register 27. I accordingly employ the motor 32 which is located in the translating unit 30 to control the operation of a power motor 33 likewise included in the translating unit. This control is at present shown as accomplished by connecting with the rotor 32a of motor 32, a shaft 34 controlling the reverse relay switch, generally designated at 35, which in turn controls the current supply to the drive motor. The reverse relay switch is at present illustrated as comprising a pair of segments 36 connected to the terminals of the drive motor 33, these segments being supported for simultaneous rotation with and at present illustrated as directly carried by a worm gear 37 driven by a worm 38 carried by the armature shaft 39 of the motor 33. Each segment 36 is slightly less than semi-circular. Adjacent ends of the segments when installed upon a common circumference, affording between adjacent ends thereof diametrically opposed gaps 40 with which are normally aligned electrically independent contact arms 50 and 51 carried by shaft 34 and connected through a suitable collector ring 52, or the like, with a source of E. M. F.

It will be obvious that any rotative displacement of shaft 34 will result in engagement of the contact 50—51 with the contacts 36 and their resulting delivery of currents to motor 33 to cause rotation thereof in a direction depending upon the direction of rotative displacement of shaft 34. Worm 38 has engagement with worm gear 37 such that this worm gear is rotated in a direction similar to the direction of rotative displacement of shaft 34, and it will be obvious that the rotation of worm 35 may only proceed through that distance necessary to bring the contact arms 50—51 into alignment with the gaps 40 between the ends or segments 36. Since armature 32a or motor 32 will partake of the same movements as armature 31a or motor 31, and the armature 31a is secured to shaft 11 to rotate therewith, it will follow that the rotative periods of motor 33 will have a direction corresponding to the direction of rotative movement of shaft 11 and an operating period corresponding to the distance through which shaft 11 is rotated.

In order that the rotation of the armature shaft of motor 33 may be converted to liquid displacement, I mount upon this armature shaft a nut 53 held against rotation in a suitable guide 54 and having threaded engagement with the shaft at 55. From this nut I suspend a displacement element 56 in the form of a body having the proper proportions and engaged to a predetermined extent in the liquid of tank 29. It will be obvious that any rotation of motor 33 will serve to further immerse, or to withdraw this displacement element, thus varying the effective level of liquid in tank 29 and causing a corresponding movement of float 28. It will also be obvious that by employing a plurality of these translating elements each connected with a motor and having properly proportioned displacement elements, the total registered by the totalizing register will always be the total produced by additions of the registrations on the meters 10.

In Fig. 2, I have illustrated semi-diagrammatically another form of a control unit employed for operation of the displacement element of the totalizing apparatus. In this form of the apparatus, the motor 32 of the displacement unit operates the switch blade 57, the ends of which operate between contact elements 58 carried by and rotating with a shaft 59 coaxial with the motor shaft. Shaft 59 has a sheave 60 supporting, through a flexible element 61 wound thereon, a displacement element 62 operating in a cylinder 63. Shaft 59 has likewise secured thereto the worm gear 64 driven by a worm 65 secured to the armature shaft of the work motor 33a. It will be obvious that in this form of apparatus, as in the construction shown in Fig. 1, a shift of the rotor of the Selsyn motor 32 will establish a circuit of motor 33a, causing the operation of this motor and, accordingly, the rotation of shaft 59 until the contacts of the reversing switch are separated. The rotation of shaft 59 will elevate or lower displacement element 62. It will, of course, be understood that movement of this displacement element, as in the construction shown in Fig. 1, is registered through a float 28 or other suitable mechanism and a totalizing register 27.

In Fig. 3 I have illustrated semi-diagrammatically a type of installation which is readily useable in many locations. In this form of the invention the shaft 66 operating the indicator 66a has associated therewith an actuator 67 at present shown as of the type illustrated in the patent to Ledoux, No. 1,064,748 granted July 17, 1913. The shaft 66 has the reversing switch arm 57 directly attached thereto for coaction with the switch arm 58 carried by the shaft 59. The switch in either of the forms of the invention shown in Figs. 2 and 3 may be constructed substantially as shown in Fig. 4, the arm 57 bearing pairs of contacts 68 and 69 on its opposite faces which are similarly connected to a source of current, while the switch arm 58 has two branches 70 and 71 each bearing pairs of contacts 72 and 73 which are oppositely connected to the work motor 33a. It will be obvious that in the form of the invention shown in Fig. 3 the shaft 59 will partake of rotations similar to those imparted to shaft 66, thus causing a corresponding movement of the displacement member 62 in its cylinder 63. This form of control apparatus for the displacement element may be conveniently employed where the meters are disposed upon the same, or substantially the same level, or where one or more of the meters is disposed adjacent to it at the same level as the totalizing apparatus.

While I have herein illustrated a particular method of producing a particular cumulative mechanical force employed in the operation of the totalizing register 27, I do not wish to be understood as limiting myself to this arrangement, as obviously any generated mechanical force capable of cumulative application could be employed as a substitute for that herein illustrated. It will be quite obvious that the extent of mechanical force generated may be so regulated that any desired type of work may be done, as for example, the operation of a chemical metering apparatus such as above referred to. The invention being otherwise susceptible to change, I do not limit myself to the arrangement herein shown except as hereinafter claimed.

I claim:

A totalizing mechanism for a plurality of meters, comprising a switch element for each meter, means to rotate each switch element about an axis proportionately to the dial movements of the associated meter, a shaft associated with and co-axial with each switch element, a reversible drive motor associated with each shaft, switch elements carried by the shaft and co-acting with the first-named switch element upon movement thereof in either direction to energize said motor to rotate said shaft in a direction and through a distance proportionate to the movement of said switch element, an open displacement cylinder associated with each shaft, a displacement piston supported from the shaft and raised and lowered by rotation thereof to vary the extent of its engagement in said cylinder, a displacement container communicating with all of said displacement cylinders, a float in said container and a register operated by said float.

MORO M. BORDEN.